(12) United States Patent
Chambers (10) Patent No.: US 10,974,647 B2
(45) Date of Patent: Apr. 13, 2021

(54) TAILGATE POSITION INDICATING DEVICE

(71) Applicant: Jeffrey Chambers, Innisfil (CA)

(72) Inventor: Jeffrey Chambers, Innisfil (CA)

( * ) Notice: Subject to any disclaimer, the term of this patent is extended or adjusted under 35 U.S.C. 154(b) by 117 days.

(21) Appl. No.: 16/359,487

(22) Filed: Mar. 20, 2019

(65) Prior Publication Data

US 2020/0298755 A1  Sep. 24, 2020

(51) Int. Cl.
*B60Q 9/00* (2006.01)
*B62D 33/027* (2006.01)
*B62D 33/03* (2006.01)

(52) U.S. Cl.
CPC ............ *B60Q 9/00* (2013.01); *B62D 33/027* (2013.01); *B62D 33/03* (2013.01)

(58) Field of Classification Search
CPC .. B62D 33/027; B62D 33/0273; B62D 33/03; B60R 1/06; B60R 13/04; B60Q 1/06; B60Q 1/30; B60Q 1/307; B60Q 9/00
See application file for complete search history.

(56) References Cited

U.S. PATENT DOCUMENTS

| | | | |
|---|---|---|---|
| D260,860 S | 9/1981 | Doman | |
| 4,863,213 A * | 9/1989 | Deaver | B62D 35/001 296/180.1 |
| 5,871,254 A * | 2/1999 | Burg | B62D 33/0273 296/180.1 |
| 6,065,423 A * | 5/2000 | Hensel | B60Q 1/305 116/209 |
| 6,374,766 B1 * | 4/2002 | Clark | B60Q 1/30 116/28 R |
| 6,799,873 B2 | 10/2004 | Fox | |
| 7,000,563 B2 * | 2/2006 | Hensel | B60Q 1/307 116/209 |
| 7,389,739 B1 * | 6/2008 | Smith | B60J 5/108 116/28 R |
| 8,907,777 B2 | 12/2014 | Greer | |
| 2003/0039126 A1 * | 2/2003 | Fox | B60Q 1/44 362/485 |
| 2003/0221305 A1 * | 12/2003 | Burg | B62D 35/007 29/407.1 |
| 2004/0094934 A1 * | 5/2004 | Teague | B60D 1/36 280/477 |
| 2006/0043769 A1 * | 3/2006 | Lehmann | B62D 35/007 296/180.1 |
| 2006/0273549 A1 | 12/2006 | Dietz | |
| 2007/0236038 A1 * | 10/2007 | Firzlaff | B62D 33/0273 296/57.1 |
| 2010/0187849 A1 * | 7/2010 | Wu | B62D 33/03 296/26.06 |
| 2011/0012385 A1 * | 1/2011 | Erstikaitis | B62D 33/0273 296/57.1 |

(Continued)

*Primary Examiner* — Gregory A Blankenship (57) ABSTRACT

A tailgate position indicating device for preventing loss of cargo and accidents includes a coupler that is configured to couple to a tailgate of a pickup truck proximate to an upper panel of the tailgate. An object is coupled to and extends from the coupler so that the object extends from the tailgate past the upper panel of the tailgate. The object is configured to be viewed in a rearview mirror of the pickup truck when the tailgate is closed to indicate to a driver of the pickup truck the position of the tailgate to prevent loss of cargo while driving and damage to the tailgate while operating the pickup truck in reverse gear.

10 Claims, 6 Drawing Sheets

(56) References Cited

U.S. PATENT DOCUMENTS

| | | | |
|---|---|---|---|
| 2014/0203587 A1* | 7/2014 | Krishnan | B60R 3/02 |
| | | | 296/62 |
| 2015/0336622 A1* | 11/2015 | Worden | E05D 11/1014 |
| | | | 280/163 |
| 2016/0101817 A1* | 4/2016 | Krishnan | B60R 3/02 |
| | | | 296/62 |
| 2018/0015962 A1* | 1/2018 | Spahn | B60R 5/041 |
| 2018/0072242 A1* | 3/2018 | Spahn | B60R 11/06 |
| 2018/0134199 A1* | 5/2018 | Mejia | B60N 3/02 |
| 2019/0255987 A1* | 8/2019 | Neighbors | B60P 3/40 |
| 2020/0070898 A1* | 3/2020 | Salvia, III | B62D 33/08 |
| 2020/0109588 A1* | 4/2020 | Nania | B62D 33/03 |
| 2020/0254917 A1* | 8/2020 | DeSimone | B62D 33/03 |
| 2020/0298755 A1* | 9/2020 | Chambers | B60Q 1/0035 |

* cited by examiner

TAILGATE POSITION INDICATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to indicating device and more particularly pertains to a new indicating device for preventing loss of cargo and accidents.

BRIEF SUMMARY OF THE INVENTION

An embodiment of the disclosure meets the needs presented above by generally comprising a coupler that is configured to couple to a tailgate of a pickup truck proximate to an upper panel of the tailgate. An object is coupled to and extends from the coupler so that the object extends from the tailgate past the upper panel of the tailgate. The object is configured to be viewed in a rearview mirror of the pickup truck when the tailgate is closed to indicate to a driver of the pickup truck the position of the tailgate to prevent loss of cargo while driving and damage to the tailgate while operating the pickup truck in reverse gear.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new indicating device embodying the principles and concepts of an embodiment of the disclosure and generally designated by the reference numeral 10 will be described.

Figure 1:
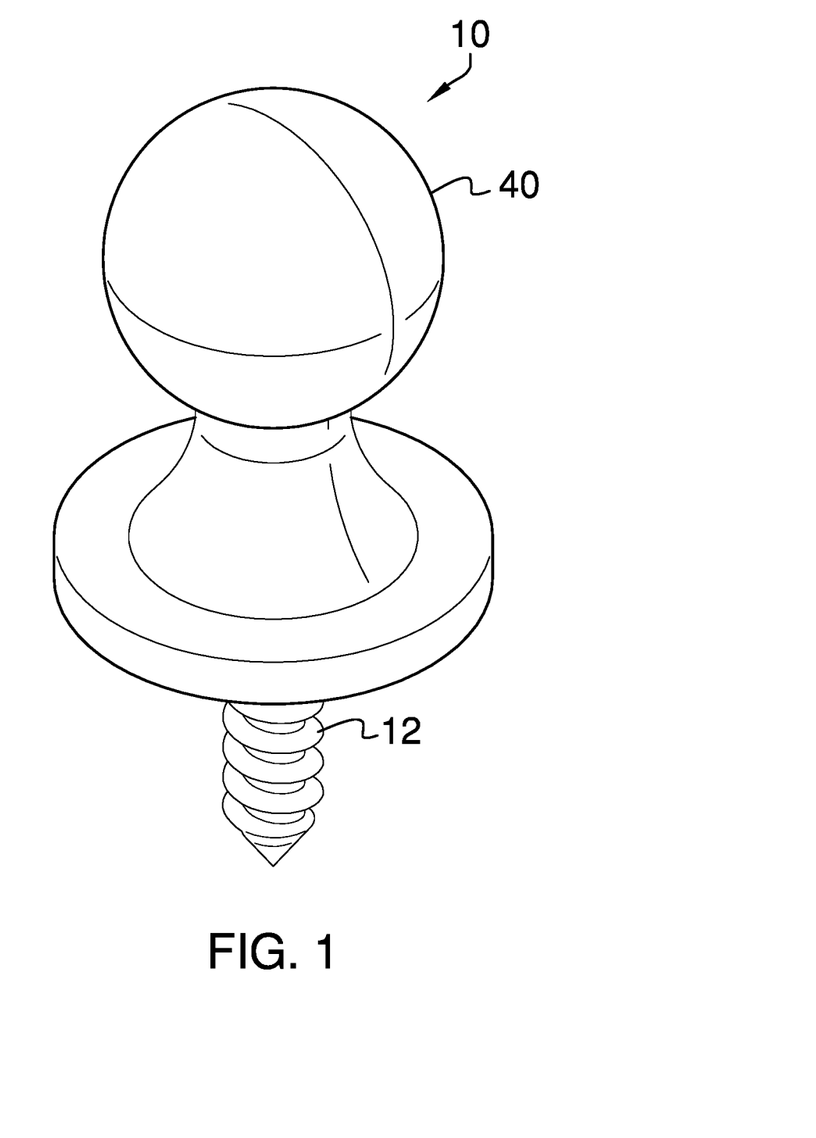
FIG. 1 is an isometric perspective view of a tailgate position indicating device according to an embodiment of the disclosure.
Figure 2:
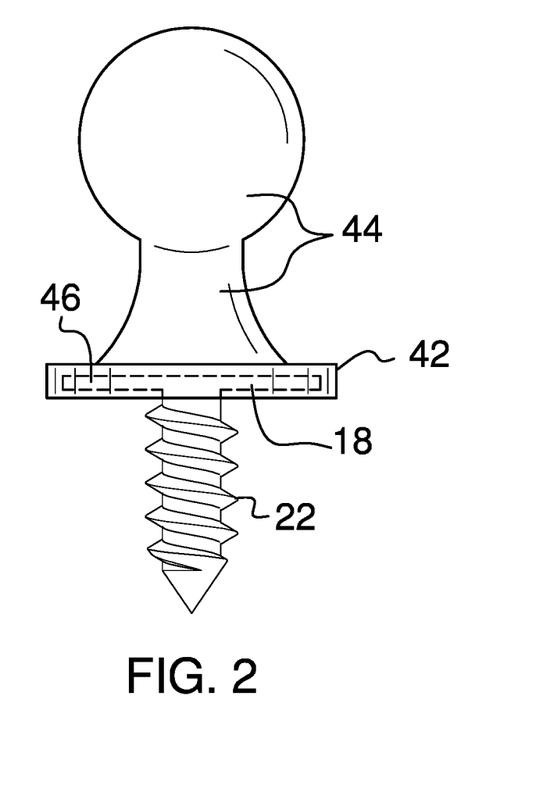
FIG. 2 is a front view of an embodiment of the disclosure.
Figure 3:
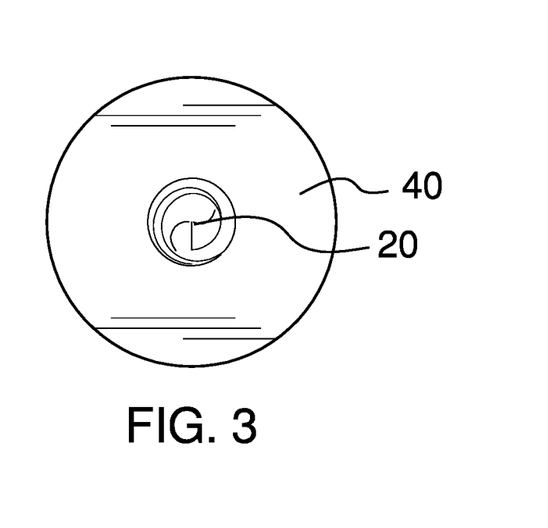
FIG. 3 is a bottom view of an embodiment of the disclosure.

As best illustrated in FIGS. 1 through 9, the tailgate position indicating device 10 generally comprises a coupler 12 that is configured to couple to a tailgate 14 of a pickup truck proximate to an upper panel 16 of the tailgate 14. The coupler 12 comprises a plate 18 and a fastening means 20. The fastening means 20 may comprise any fastener or combination of fasteners known to those skilled in the art of fasteners. For example, the fastening means 20 may comprise an integral tap screw 22 that is coupled to and extends from the plate 18, as shown in FIG. 2. The integral tap screw 22 is configured to tap into the tailgate 14 and to threadedly couple to the tailgate 14 to couple the plate 18 to the tailgate 14 proximate to the upper panel 16 of the tailgate 14. The plate 18 and the integral tap screw 22 comprise at least one of galvanized steel and stainless steel.

Figure 5:
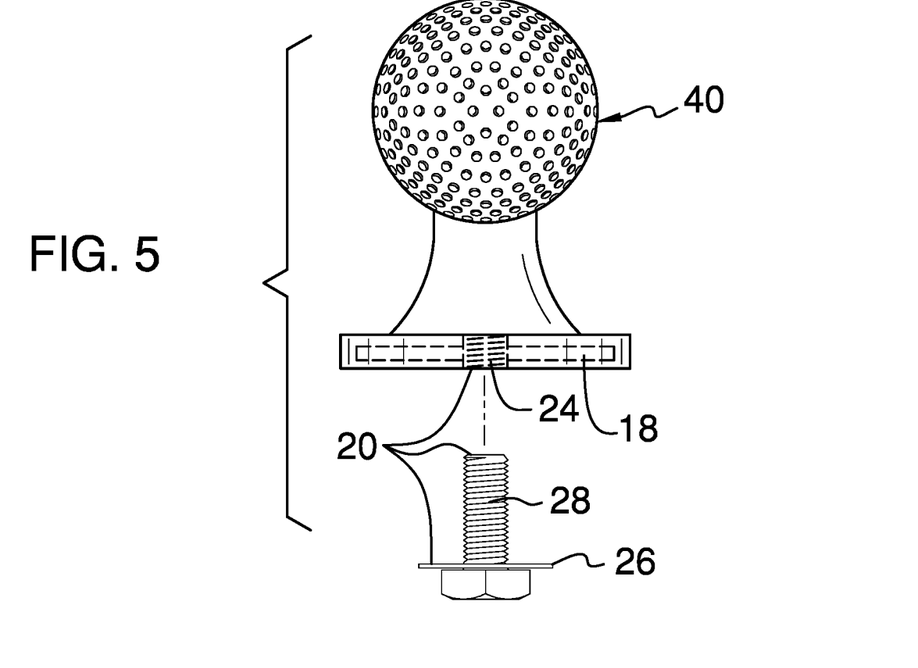
FIG. 5 is a front-cross-sectional view of an embodiment of the disclosure.

The fastening means 20 also may comprise a plurality of threaded holes 24 that is positioned in the plate 18, as shown in FIG. 5, a plurality of corresponding holes (not shown) that is positioned in the tailgate 14, a plurality of washers 26, and a plurality of bolts 28. A respective bolt 28 is positioned to insert first through a respective washer 26, then through a respective corresponding hole so that the washer 26 abuts an inner face 30 of the tailgate 14, and finally then to be threadedly inserted into an associated threaded hole 24 to couple the plate 18 to the tailgate 14 proximate to the upper panel 16 of the tailgate 14. The plurality of threaded holes 24 comprises one threaded hole 24 that is substantially centrally positioned in the plate 18.

Figure 6:
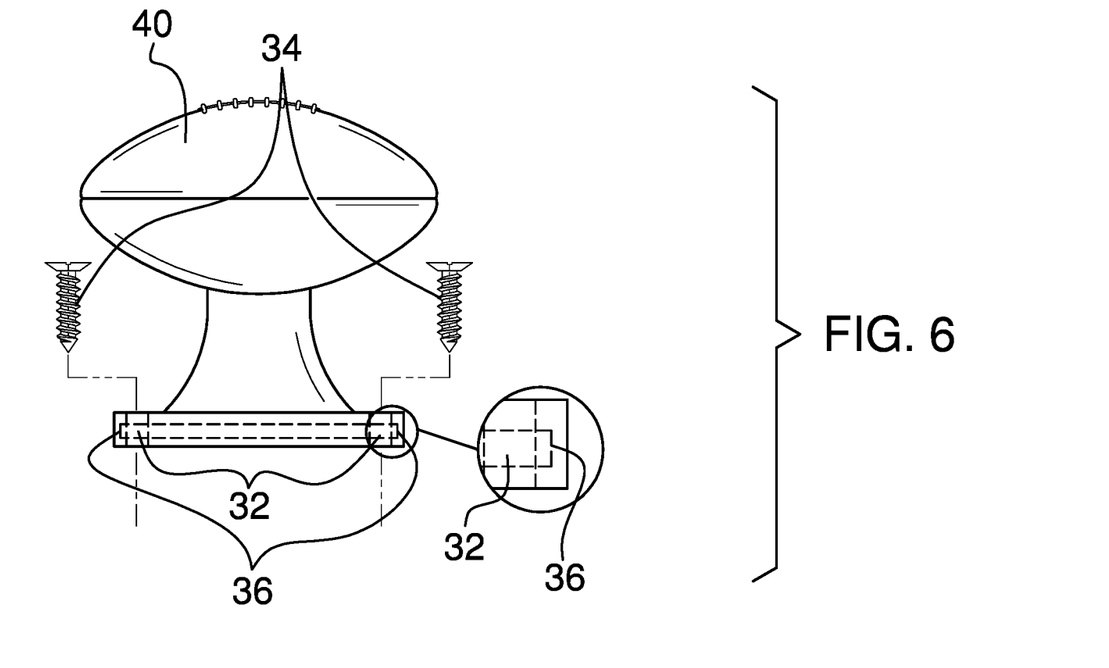
FIG. 6 is a front-cross-sectional view of an embodiment of the disclosure.

The fastening means 20 also may comprise a plurality of orifices 32 that is positioned in the plate 18, as shown in FIG. 6, and a plurality of headed tap screws 34. Each headed tap screw 34 is configured to be inserted through a respective orifice 32, to tap into the tailgate 14, and to threadedly couple to the tailgate 14 to couple the plate 18 to the tailgate 14 proximate to the upper panel 16 of the tailgate 14. The plurality of orifices 32 comprises two orifices 32 that are positioned singly proximate to opposing sides 36 of the plate 18.

Figure 7:
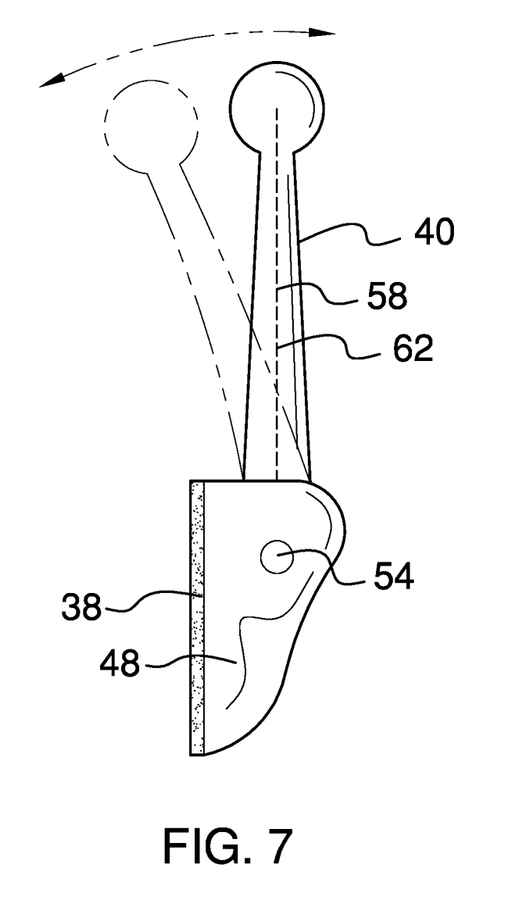
FIG. 7 is a side view of an alternative embodiment of the disclosure.
Figure 9:
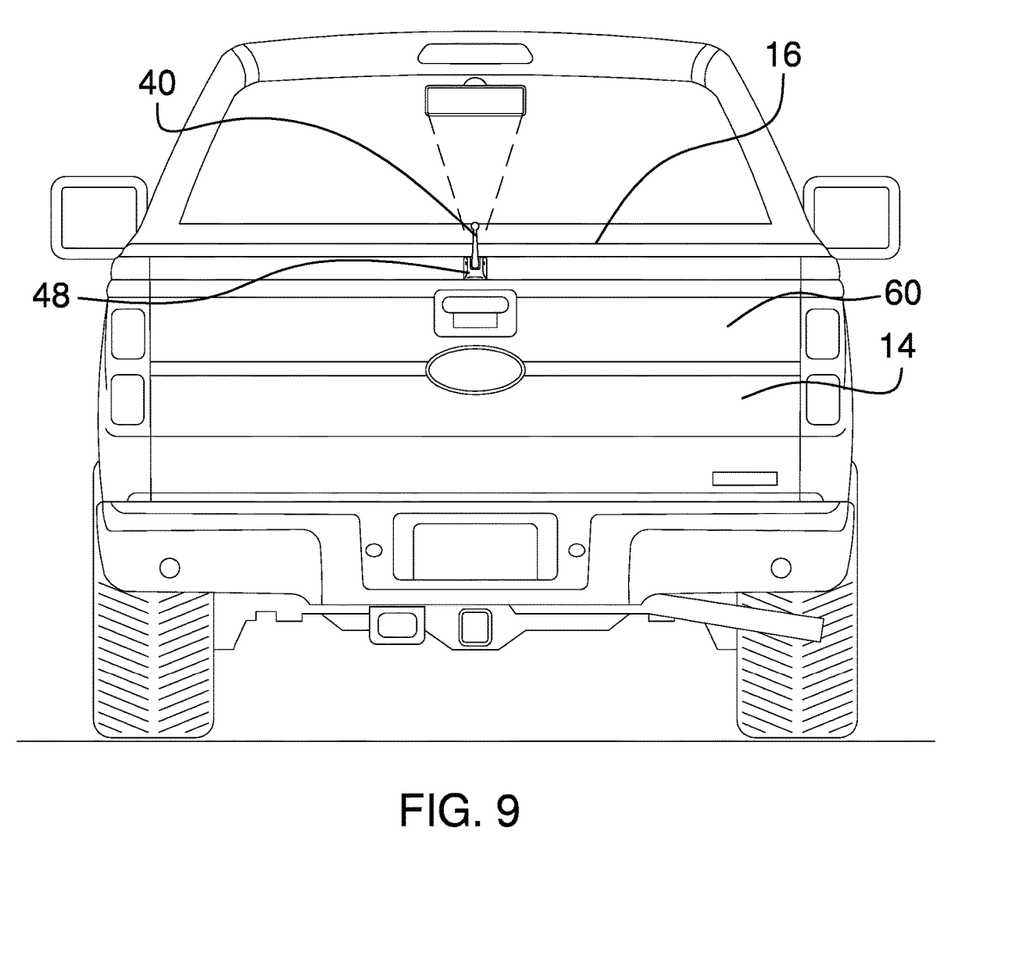
FIG. 9 is an in-use view of an embodiment of the disclosure.

The fastening means 20 also may comprise an adhesive 38 that is coupled to the plate 18, as shown in FIG. 7. The adhesive 38 is configured to adhesively couple the plate 18 to the tailgate 14 proximate to the upper panel 16 of the tailgate 14, as shown in FIG. 9.

Figure 4:
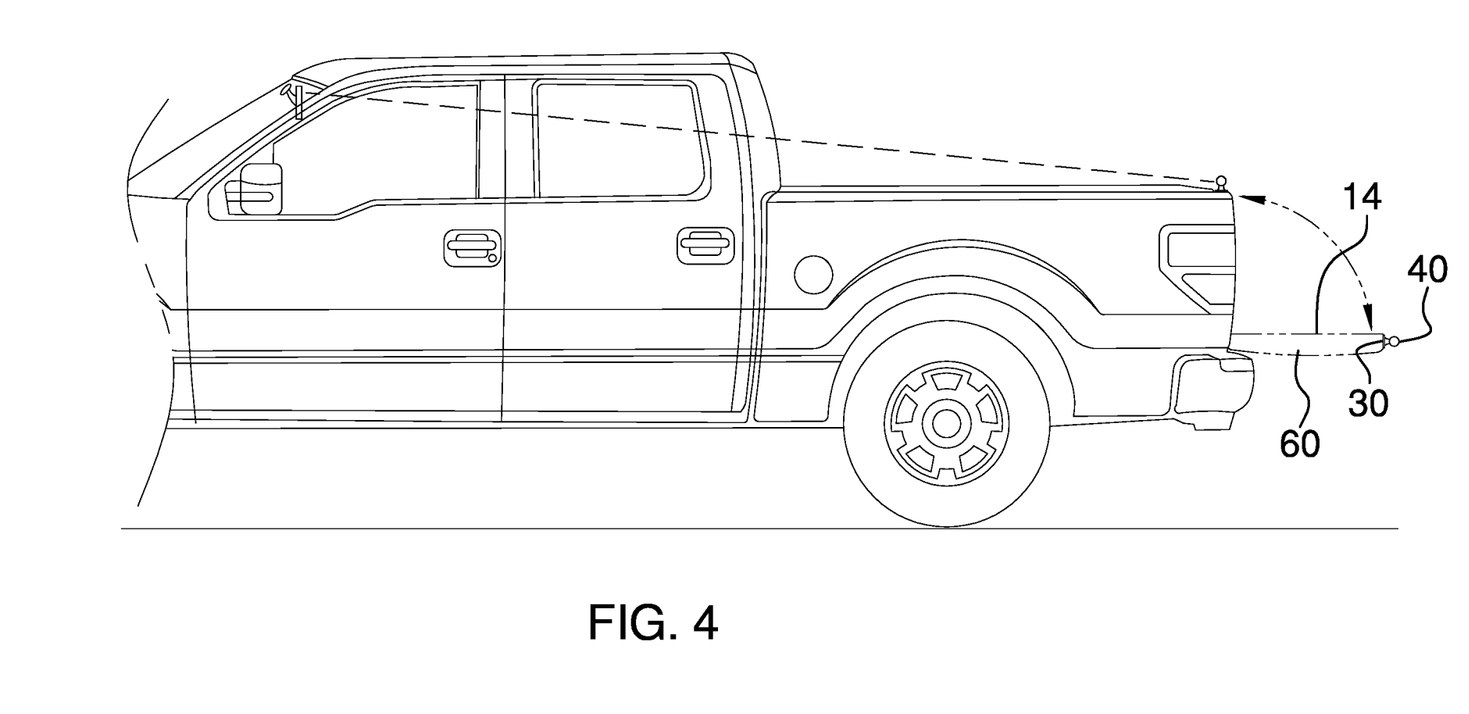
FIG. 4 is an in-use view of an embodiment of the disclosure.

An object 40 is coupled to and extends from the coupler 12 so that the object 40 extends from the tailgate 14 past the upper panel 16 of the tailgate 14. The object 40 is configured to be viewed in a rearview mirror of the pickup truck when the tailgate 14 is closed, as shown in FIGS. 4 and 9, to indicate to a driver of the pickup truck the position of the tailgate 14 to prevent loss of cargo while driving and damage to the tailgate 14 while operating the pickup truck in reverse gear.

The object 40 comprises at least one of rubber, silicone, and plastic so that the object 40 is resiliently deformable. The object 40 is reflective of light so that the object 40 is viewable in low light environments.

In embodiments where the coupler 12 is to be coupled to the upper panel 16 of the tailgate 14, the object 40 comprises a first section 42 and a second section 44. A cavity 46 is positioned in the first section 42. The plate 18 is positioned in the cavity 46 so that the first section 42 is coupled to the plate 18. The positioning of the plate 18 in the cavity 46 may occur due to vulcanization of the first section around the plate 18. The second section 44 is coupled to and extends from the first section 42. The second section 44 is shaped to resemble an item of interest to the driver so that the second section 44 is readily discernable to the driver. For example, the second section 44 may be ball shaped as shown in FIG. 1, golf ball shaped as shown in FIG. 5, football shaped as shown in FIG. 6, or any other shape that may be of interest to the driver.

Figure 8:
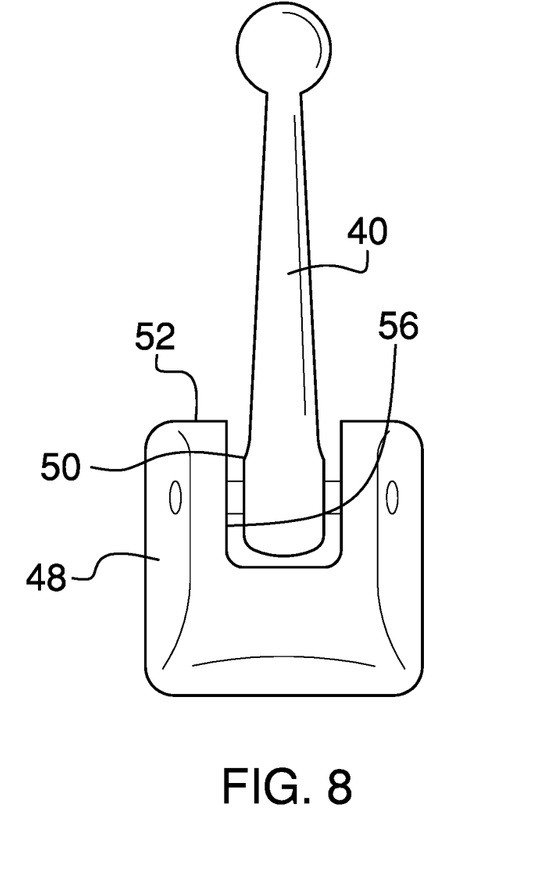
FIG. 8 is a front view of the embodiment of the disclosure.

In another embodiment of the invention, as shown in FIGS. 7-9, the plate 18 comprises a block 48. A recess 50 extends into an upper end 52 of the block 48. A rod 54 is coupled to and extends between opposing edges 56 of the recess 50. The object 40 is coupled to and extends from the rod 54. A biaser 58 is positioned in the object 40 so that the biaser 58 is positioned to return the object 40 from a deflected position to a default position, wherein the object 40 extends substantially parallelly with a rear panel 60 of the tailgate 14 past the upper panel 16 of the tailgate 14. The object 40 thus is configured to be viewed in the rearview mirror of the pickup truck when the tailgate 14 is closed to indicate to the driver of the pickup truck the position of the tailgate 14 to prevent loss of the cargo while driving and damage to the tailgate 14 while operating the pickup truck in reverse gear. The biaser 58 comprises a linear spring 62, as shown in FIG. 7. The device 10 of this embodiment allows for the object 40 to be impacted, wherein the object is deflected before returning to the default position, thus reducing the likelihood of damage to the object 40.

In use, the coupler 12 is coupled to the tailgate 14 so that the object 40 extends from the tailgate 14 past the upper panel 16 of the tailgate 14. The object 40 is configured to be viewed in the rearview mirror of the pickup truck when the tailgate 14 is closed to indicate to the driver the position of the tailgate 14. The device 10 helps to prevent inadvertent failure to close the tailgate 14 and potential loss of cargo while driving. Additionally, the device 10 helps to prevent damage to the tailgate 14 while operating the pickup truck in reverse gear.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tailgate position indicating device comprising:
a coupler configured for coupling to a tailgate of a pickup truck proximate to an upper panel of the tailgate;
an object coupled to and extending from the coupler such that the object extends from the tailgate past the upper panel of the tailgate wherein the object is configured for being viewed in a rearview mirror of the pickup truck when the tailgate is closed for indicating to a driver of the pickup truck the position of the tailgate for preventing loss of cargo while driving and damage to the tailgate while operating the pickup truck in reverse gear;
the coupler comprising a plate and a fastening means, the fastening means comprising at least one of
an integral tap screw coupled to and extending from the plate wherein the integral tap screw is configured for tapping into the tailgate and threadedly coupling to the tailgate for coupling the plate to the tailgate proximate to the upper panel of the tailgate,
a plurality of threaded holes positioned in the plate, a plurality of corresponding holes positioned in the tailgate, a plurality of washers, and a plurality of bolts, a respective bolt being positioned for inserting first through a respective washer, then through a respective corresponding hole such that the washer abuts an inner face of the tailgate, and finally then for threadedly inserting into an associated threaded hole for coupling the plate to the tailgate proximate to the upper panel of the tailgate,
a plurality of orifices positioned in the plate and a plurality of headed tap screws wherein each headed tap screw is configured for inserting through a respective orifice, tapping into the tailgate, and threadedly coupling to the tailgate for coupling the plate to the tailgate proximate to the upper panel of the tailgate, and
an adhesive coupled to the plate wherein the adhesive is configured for adhesively coupling the plate to the tailgate proximate to the upper panel of the tailgate;
a first section;

a cavity positioned in the first section, the plate being positioned in the cavity such that the first section is coupled to the plate, and a second section coupled to and extending from the first section; the second section being shaped to resemble an item of interest to the driver such that the second section is readily discernable to the driver.

2. The device of claim 1, further including the plate and the integral tap screw comprising at least one of galvanized steel and stainless steel.

3. The device of claim 1, further including the plurality of threaded holes comprising one threaded hole substantially centrally positioned in the plate.

4. The device of claim 1, further including the plurality of orifices comprising two orifices positioned singly proximate to opposing sides of the plate.

5. The device of claim 1, further including the object comprising at least one of rubber, silicone, and plastic such that the object is resiliently deformable.

6. The device of claim 1, further including the object being reflective of light such that the object is viewable in low light environments.

7. A tailgate position indicating device comprising:

a coupler configured for coupling to a tailgate of a pickup truck proximate to an upper panel of the tailgate; and an object coupled to and extending from the coupler such that the object extends from the tailgate past the upper panel of the tailgate wherein the object is configured for being viewed in a rearview mirror of the pickup truck when the tailgate is closed for indicating to a driver of the pickup truck the position of the tailgate for preventing loss of cargo while driving and damage to the tailgate while operating the pickup truck in reverse gear, the object comprising at least one of rubber, silicone, and plastic such that the object is resiliently deformable;

the plate comprising a block;

a recess extending into an upper end of the block;

a rod coupled to and extending between opposing edges of the recess, the object being coupled to and extending from the rod; and a biaser positioned in the object such that the biaser is positioned for returning the object from a deflected position to a default position wherein the object extends substantially parallelly with a rear panel of the tailgate past the upper panel of the tailgate wherein the object is configured for being viewed in the rearview mirror of the pickup truck when the tailgate is closed for indicating to the driver of the pickup truck the position of the tailgate for preventing loss of the cargo while driving and damage to the tailgate while operating the pickup truck in reverse gear.

8. The device of claim 7, further including the biaser comprising a linear spring.

9. A tailgate position indicating device comprising:

a coupler configured for coupling to a tailgate of a pickup truck proximate to an upper panel of the tailgate, the coupler comprising a plate and a fastening means, the fastening means comprising at least one of:

an integral tap screw coupled to and extending from the plate wherein the integral tap screw is configured for tapping into the tailgate and threadedly coupling to the tailgate for coupling the plate to the tailgate proximate to the upper panel of the tailgate, the plate and the integral tap screw comprising at least one of galvanized steel and stainless steel, a plurality of threaded holes positioned in the plate, a plurality of corresponding holes positioned in the tailgate, a plurality of washers, and a plurality of bolts, a respective bolt being positioned for inserting first through a respective washer, then through a respective corresponding hole such that the washer abuts an inner face of the tailgate, and finally then for threadedly inserting into an associated threaded hole for coupling the plate to the tailgate proximate to the upper panel of the tailgate, the plurality of threaded holes comprising one threaded hole substantially centrally positioned in the plate, a plurality of orifices positioned in the plate and a plurality of headed tap screws wherein each headed tap screw is configured for inserting through a respective orifice, tapping into the tailgate, and threadedly coupling to the tailgate for coupling the plate to the tailgate proximate to the upper panel of the tailgate, the plurality of orifices comprising two orifices positioned singly proximate to opposing sides of the plate, and an adhesive coupled to the plate wherein the adhesive is configured for adhesively coupling the plate to the tailgate proximate to the upper panel of the tailgate; and an object coupled to and extending from the coupler such that the object extends from the tailgate past the upper panel of the tailgate wherein the object is configured for being viewed in a rearview mirror of the pickup truck when the tailgate is closed for indicating to a driver of the pickup truck the position of the tailgate for preventing loss of cargo while driving and damage to the tailgate while operating the pickup truck in reverse gear, the object comprising at least one of rubber, silicone, and plastic such that the object is resiliently deformable, the object being reflective of light such that the object is viewable in low light environments, the object comprising:

a first section, a cavity positioned in the first section, the plate being positioned in the cavity such that the first section is coupled to the plate, and a second section coupled to and extending from the first section, the second section being shaped to resemble an item of interest to the driver such that the second section is readily discernable to the driver.

10. The device of claim 9, further including the plate comprising a block;

a recess extending into an upper end of the block;

a rod coupled to and extending between opposing edges of the recess, the object being coupled to and extending from the rod; and a biaser positioned in the object such that the biaser is positioned for returning the object from a deflected position to a default position wherein the object extends substantially parallelly with a rear panel of the tailgate past the upper panel of the tailgate wherein the object is configured for being viewed in the rearview mirror of the pickup truck when the tailgate is closed for indicating to the driver of the pickup truck the position of the tailgate for preventing loss of the cargo while driving and damage to the tailgate while operating the pickup truck in reverse gear, the biaser comprising a linear spring.

* * * * *